United States Patent [19]

Johansson

[11] 4,248,769

[45] Feb. 3, 1981

[54] METHOD FOR WASHING OF CRUDE TALL OIL SOAP FROM THE SULFATE PULPING PROCESS

[75] Inventor: Åke A. Johansson, Meyrin, Switzerland

[73] Assignee: Linotek Oy, Jarvenpaa, Finland

[21] Appl. No.: 20,016

[22] Filed: Mar. 13, 1979

[30] Foreign Application Priority Data

Apr. 5, 1978 [FI] Finland ................................ 781051

[51] Int. Cl.[3] ........................ C09F 1/00; D21C 11/00

[52] U.S. Cl. .................................... 260/97.7; 162/16; 162/29

[58] Field of Search .................... 162/16, 29; 260/97.7

[56] References Cited

U.S. PATENT DOCUMENTS 3,575,952 4/1971 Morris et al. ........................ 260/97.7

*Primary Examiner*—H. S. Cockeram

*Attorney, Agent, or Firm*—Young & Thompson

[57] ABSTRACT

A method for washing of crude tall oil soap obtained from the sulfate pulping process using alkalized spent acid from tall oil acidulation as washing liquid by mixing the crude soap and the washing liquid coming from the process and by cooling the mixture in a separation tank by either stirring with a slowly moving agitator or by circulating the soap or soap mixture through a pump and a cooler.

3 Claims, 2 Drawing Figures

METHOD FOR WASHING OF CRUDE TALL OIL SOAP FROM THE SULFATE PULPING PROCESS

Figure 1:
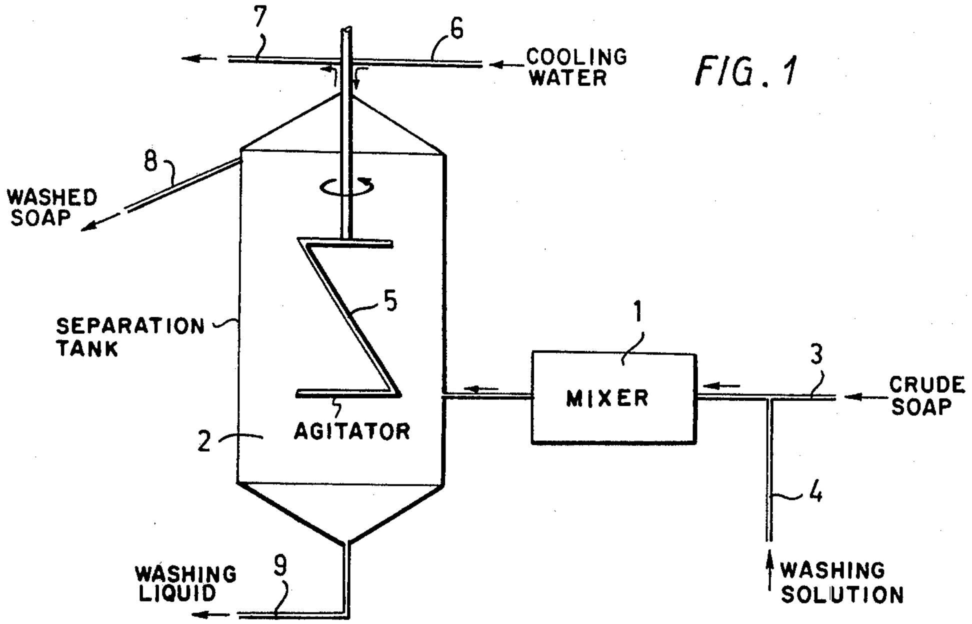

This invention relates to a method for washing of crude tall oil soap from the sulfate pulping process.

In the alkaline cooking of sulfate pulp, the resin and fatty acids contained in the wood raw material form soaps with the alkaline compounds in the cooking liquor. In the concentration or evaporation of cooking liquor—generally called black liquor in the sulfate process—the soaps of resin and fatty acids and neutral components emulgated in the soaps are separated on the surface of the black liquor, and collected for further treatment. This viscous soap mixture is generally called tall oil soap, if the wood furnish used in the sulfate process is mainly pinewood, or mixed soap, if the wood furnish contains considerable amounts of hardwood, such as birch. In the latter case, the separated soap contains large amounts of so called neutrals, which cause deterioration of the quality of the products obtained from further processing of the soap.

The separation of crude tall oil soap from black liquor is a slow and incomplete process. In practice a small amount of soap always remains dissolved in the black liquor, on the other hand, the separated crude soap contains occluded drops of black liquor, which can not be separated due to the high viscosity of the soap and to the adsorption and capillary forces.

In the further treatment, the so-called tall oil acidulation, fatty and resin acids are liberated from the soap by treating the soap with a concentrated mineral acid, for economical reasons most often with sulfuric acid or with so-called residual acid from the pulp bleaching plant which contains sulfuric acid and sodium sulfate. In the acidulation, fatty and resin acids as well as neutrals are separated as a water insoluble oily layer on the surface of the spent acid, or so-called brine, which is removed by decanting. The spent acid is returned to the sulfate process for the recovery of cooking chemicals.

If the crude soap entering acidulation contains occluded black liquor, the alkali metal lignates (1–20 wt. %) dissolved in the black liquor preciptate as lignin during the acidulation. This bulky lignin sludge makes the separation of tall oil from spent acid difficult and thus reduces the yield of tall oil. The occluded black liquor in the crude soap causes an increased consumption of acid in the acidulation. During the acidulation, hydrogen sulfide is released from sulfides dissolved in black liquor resulting in air pollution problems.

For the reasons described above it can be stated that the removal of occluded black liquor from the crude soap increases the economy of the acidulation considerably.

It is known (Swedish Pat. Nos. 83293 (1933) and 92204 (1937)) that the black liquor content of crude soap can be decreased by washing the crude soap before acidulation. In the washing stage the crude soap containing black liquor is mixed with a concentrated salt solution, the most commonly used washing liquid being an 18% sodium sulfate solution. The soap is not dissolved in the solution but is separated on the surface of the heavier water phase, where it can be collected for further treatment. The black liquor and the alkali metal lignate are dissolved in the salt solution, which can be returned, for instance, to the chemical recovery of the sulfate process.

Often the spent acid from the acidulation, neutralized, for instance, with soap or sodium hydroxide (white liquor), is used as washing liquid. Several studies and methods have been suggested for the optimization of the crude soap washing (Komshilov-Polazkaeva, USSR pat. no. 502992, Feb. 15 (1976) now U.S. Pat. No. 3,936,514) but so far no practical solution has been found which makes washing under optimal conditions possible in industrial scale applications.

The washing of the crude tall oil soap is difficult to perform in optimum conditions, because both of the crude soap and the spent acid are coming from the process at a high temperature of about 80° C. At this temperature, the washed soap separates from the washing liquid very slowly which leads to unsatisfactory results and a need for a long retention time. Cooling of the soap, on the other hand, is difficult to perform in the known processes, because pumping of the soap and cleaning of the cooling surfaces are very difficult to perform due to the very high viscosity of the cooled soap. The washing efficiency also decreases at low temperatures.

Now a method has been invented, where the above mentioned difficulties are overcome. According to the invention the removal of black liquor from soap is performed in the following manner:

- the crude tall oil soap and the washing liquid are mixed at the temperature which they have when they are coming from the process, preferably 60°–80° C.,
- the mixture of soap and washing liquid, which can not be separated into two phases at this temperature, is cooled to a properly chosen temperature of 35°–50° C. in a separation tank by using a moving (rotating) cooling surface or by circulating the mixture in a proper manner through a heat exchanger, and
- the separated washed soap is pumped from the separation tank to the acidulation, and the washing liquid is returned to the chemical recovery of the sulfate process.

Using the arrangements described above the difficulties in the cooling of the soap are avoided because the moving cooling surface cleans itself continuously, and at the same time the moving suitably designed cooling surface improves the separation of washing liquid drops from the viscous soap. It may still be pointed out that the purpose of the moving cooling curface in the separation tank is not to mix the soap and washing liquid but to cool the mixture and to improve the separation of the washing liquid from the very viscous soap. It has been noticed too, that the washing efficiency and the efficiency of the separation of the soap from the washing liquid can be increased by adding excess alkali to the washing liquid so that the pH value of the washing liquid is 14 in the presence of excess alkali.

Figure 2:
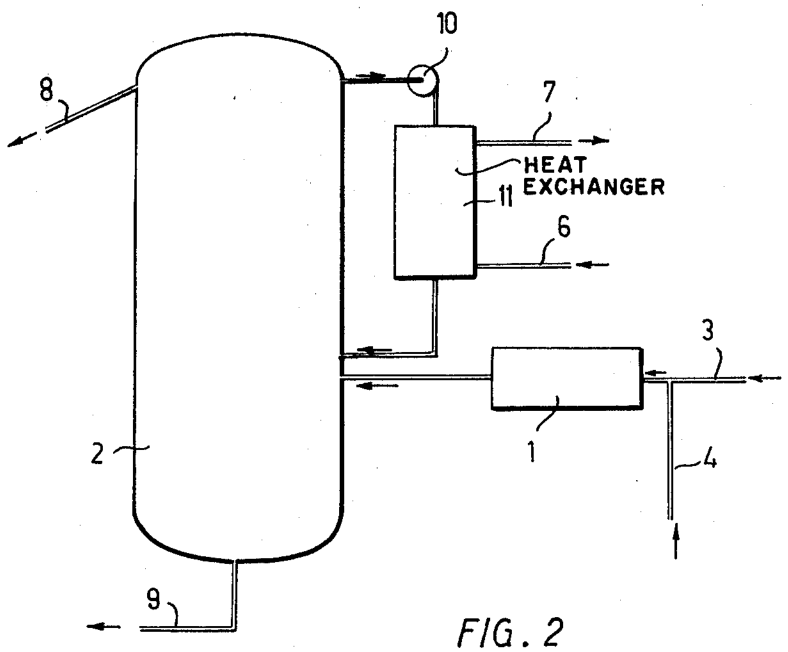

In FIGS. 1 and 2 are shown two apparatuses for use in the process according to the invention.

In FIG. 1 is shown a mixer 1 and a separation tank 2 with a cooled agitator 5. The crude soap 3 and the washing solution 4 are mixed in the mixer 1, and the mixture is cooled in the separation tank 5 by cooling water 6, 7. The washed soap 8 is pumped from the upper part of the separation tank and the washing liquid 9 from the lower part and returned to the chemical recovery of the sulfate process.

As shown in FIG. 2, in which similar parts are designated by the same reference numerals it is also possible to cool the soap or the soap mixture by circulating it through a pump 10 and a heat exchanger 11, whereby the soap or soap mixture is pumped from the upper part of the tank to the boundary layer of soap and washing liquid.

This invention has been applied with success for the washing of black liquor from crude tall oil soap as can be seen from the following examples.

EXAMPLE 1

About 200 ml crude tall oil soap with a dry substance content of 66.2 wt. % was mixed with 200 ml of neutralized spent acid from acidulation containing about 18 wt. % $Na_2SO_4$ neutralized with sodium hydroxide to a pH-value of 7. The temperatures of both soap and spent acid were during mixing about 80° C. When the mixture was kept at a constant temperature of 80° C., no separation of the phases could be observed after six hours.

When the mixture described above was stirred gently with a cooled helical agitator, the separation of the washing liquid to the bottom of the vessel started. After ½ hour of mixing the soap and washing liquid were separated almost completely at a final temperature of about 40° C. The efficiency of washing was verified by comparing the lignin content of the washed and unwashed tall oil soap analyzed by TAPPI standard methods. The following results were obtained.

| | | |
|---|---|---|
| The lignin content of crude tall oil soap | 0.7% | (lignin d.s./soap d.s.) |
| The lignin content of washed soap | 0.5% | |
| The dry substance (d.s.) content of the washed soap was | 63.7% | |

EXAMPLE 2

About 200 ml crude tall oil with a dry substance content of 65.5% was washed by mixing at 80° C. with 200 ml neutralized spent acid from acidulation containing 18% $Na_2SO_4$. The washing liquid was neutralized by adding 5 cc 2N-NaOH-solution resulting in a pH-value of 14. After ½ hour gently stirring with a helical-shaped cooled agitator, the soap and the washing liquid were nearly completely reparated from each other at a temperature of the mixture of about 50° C. The washing efficiency was verified by comparing the lignin content of the washed and unwashed soap. The following results were obtained:

| | | |
|---|---|---|
| Crude tall oil soap | 0.7% | (lignin d.s./soap d.s.) |
| Washed soap | 0.3% | |

The dry substance content of the washed soap was 63.6%.

EXAMPLE 3

A washing operation similar to Example 2 was performed, but before washing 25 ml 2N-NaOH was added to the washing liquid resulting in a pH-value of 14. The lignin content of the soap was analyzed before and after washing. The results were:

-continued

| | | |
|---|---|---|
| Crude tall oil soap | 0.7% | (lignin d.s./soap d.s.) |
| Washed soap | 0.0% | |

The dry substance content of the washed soap was 62.4%.

EXAMPLE 4

About 200 ml of crude tall oil soap with a dry substance content of 68% was mixed with 200 cc neturalized spent acid from acidulation containing 18% $Na_2SO_4$. After 2 hours mixing at 80° C. no separation of phases could be observed. When the mixture was circulated by a pump through a cooling coil (45° C.) so that the soap (soap mixture) was drawn off from the surface of the vessel and returned to the rapidly forming soap-washing liquid interface near the middle of the vessel, the soap and the washing liquid separated almost completely after ½ hour circulating. The lignin content of the soap was analyzed before and after washing. The following results were obtained:

| | | |
|---|---|---|
| Crude tall oil soap | 0.7% | (lignin d.s./soap d.s.) |
| Washed soap | 0.05% | |

The dry substance content of the washed soap was 63.3%.

EXAMPLE 5

About 2.5 $m^3/h$ crude tail oil soap at a temperature of 72° C. and with a dry substance content of 59.7% was mixed continuously with 1.5 $m^3/h$ washing liquid, with a temperature of 79° C. and a dry substance content of 18.8% and prepared by neutralizing spent acid from tall oil acidulation with white liquor to a pH-value of 10.7. After mixing, the soap-washing liquid mixture was fed into a separation tank, where a moving cooling surface by gently stirring cooled the soap-washing liquid mixture to an average temperature of about 40°–45° C. In the separation tank both phases separated from each other. The washing liquid was continuously removed from the bottom of the separation tank, while the washed soap was continuously removed as an overflow from the top of the separation tank. The lignin content of the soap was analyzed before and after washing. The following results were obtained:

| | | |
|---|---|---|
| Crude tall oil soap | 1.01% | (lignin d.s./soap d.s.) |
| Washed soap | 0.34% | |

The dry substance content of the washed soap was 65.5%.

EXAMPLE 6

About 2.5 $m^3/h$ crude tall oil soap at a temperature of 75° C. containing 62.1% dry substance was mixed continuously with 1.0 $m^3/h$ washing liquid with a temperature of 80° C. and dry substance content of 15.7% and prepared by neutralizing spent acid from tall oil acidulation with white liquor resulting in a pH-value of 10.5. After mixing, the soap-washing liquid mixture was fed into a separation tank, where a moving cooling surface by gently stirring cooled the soap-washing liquid mixture an average temperature of about 35° C. In the separation tank both phases separated from each other. The washing liquid was continuously removed from the bottom of the separation tank, while the washed soap was continuously removed as an overflow from the top of the separation tank. The lignin content of the soap was analyzed before and after washing. The following results were obtained:

| | | |
|---|---|---|
| Crude tall oil soap | 0.99% | (lignin d.s./soap d.s.) |
| Washed soap | 0.42% | |

The dry substance content of the washed soap was 62.9%.

What I claim is:

1. A method for washing crude soap from the sulphate cellulose process using alkaline mother liquor from tall oil cooking as washing liquid, comprising mixing the crude soap and the washing liquid vigorously at the temperature of 60°-80° C. that they have when they are coming from said sulphate cellulose process, transferring the mixture thus obtained into a separation tank, effecting separation between soap and washing liquid in the tank by a combined agitation and cooling operation at a temperature of 40°-50° C., whereby the mixture of the soap and the washing liquid is cooled to said temperature, and thereafter separately removing the washed soap and the washing liquid from the tank.

2. A method as claimed in claim 1, in which said separation between soap and washing liquid in the tank is effected by stirring with a slowly moving cooled agitator disposed in the separation tank.

3. A method as claimed in claim 1, in which said separation between soap and washing liquid in the tank is effected by circulating the mixture of the soap and the washing liquid through a pump and a cooler, by withdrawing material from the surface of the separation tank to the pump and returning the withdrawn material after passage through the cooler into the material within the tank near the interface between the soap and the washing liquid at an intermediate point in the tank.

* * * * *